United States Patent
Wisniewski

[19]

[11] Patent Number: 6,141,837
[45] Date of Patent: Nov. 7, 2000

[54] EDIAS CLIP FOR SECURING AN INTERIOR MOLDING TO A VEHICLE FRAME

[76] Inventor: David M. Wisniewski, 15762 Claire Ct., Macomb Township, Mich. 48042

[21] Appl. No.: 09/258,976

[22] Filed: Feb. 26, 1999

[51] Int. Cl.[7] .............................. A44B 17/00; F16B 21/00
[52] U.S. Cl. ................................ 24/295; 24/289; 24/293; 24/458
[58] Field of Search ............................ 24/295, 293, 458, 24/289

[56] References Cited

U.S. PATENT DOCUMENTS

| | | |
|---|---|---|
| 2,499,637 | 3/1950 | Flora .......................................... 24/295 |
| 2,631,345 | 3/1953 | Poupitch .................................... 24/293 |
| 3,137,372 | 6/1964 | Nash .......................................... 24/458 |
| 3,310,929 | 3/1967 | Garvey . |
| 3,374,577 | 3/1968 | Salloum . |
| 3,378,983 | 4/1968 | Anderson . |
| 3,486,158 | 12/1969 | Soltysik et al. . |
| 3,933,076 | 1/1976 | Tanaka . |
| 3,977,048 | 8/1976 | Benedetti ................................... 24/293 |
| 4,103,400 | 8/1978 | Munse . |
| 4,556,337 | 12/1985 | Marshall ................................... 403/255 |
| 4,630,338 | 12/1986 | Ostrland et al. . |
| 4,642,859 | 2/1987 | Kaiser . |
| 4,729,706 | 3/1988 | Peterson et al. . |
| 4,784,430 | 11/1988 | Biermacher . |
| 4,865,505 | 9/1989 | Okada . |
| 4,971,500 | 11/1990 | Benoit et al. . |
| 5,086,603 | 2/1992 | Graf et al. . |
| 5,095,592 | 3/1992 | Doerfling . |
| 5,099,549 | 3/1992 | Hullmann et al. . |
| 5,129,768 | 7/1992 | Hoyle et al. . |
| 5,186,517 | 2/1993 | Gilmore et al. .......................... 24/295 |
| 5,229,175 | 7/1993 | Seabolt . |
| 5,249,900 | 10/1993 | Mitts . |
| 5,263,233 | 11/1993 | Kim et al. . |
| 5,310,298 | 5/1994 | Hwang . |
| 5,347,690 | 9/1994 | Mansoor et al. . |
| 5,367,751 | 11/1994 | Dewitt . |
| 5,458,365 | 10/1995 | Rogers et al. . |
| 5,507,545 | 4/1996 | Krysiak . |
| 5,526,553 | 6/1996 | Klein . |
| 5,722,124 | 3/1998 | Wisniewski . |
| 5,887,319 | 3/1999 | Smith ........................................ 24/293 |

FOREIGN PATENT DOCUMENTS

| | | |
|---|---|---|
| 1477535 | 4/1967 | France . |
| 1250688 | 9/1967 | Germany . |
| 1389829 | 4/1975 | United Kingdom . |

*Primary Examiner*—Victor N. Sakran
*Attorney, Agent, or Firm*—Gifford, Krass, Groh, Sprinkle, Anderson & Citowski, P.C.

[57] ABSTRACT

A clip for securing an interior molding to a vehicle frame. The clip includes a body having a first upwardly extending side and a second upwardly extending side. First and second flattened base plates extend in perpendicular and opposite fashion from terminating bottom edges of the upwardly extending sides and corresponding top edges of the sides are integrally connected to a substantially "U" shaped curved and interconnecting top portion. The base plates are spaced apart to define therebetween a central and vertical opening in the clip body for receiving in inserting fashion a thin and elongate projection of the trim piece or molding to be applied. From inwardly facing and opposing surfaces of the base plates extend inwardly and upwardly directed tangs for securing to the molding. First and second elongate and spring biased members extend in generally downwardly and first and second reverse bended fashion from the opposing edges of the "U" shaped interconnecting portion. First and second bulbous and outwardly projecting portions extend from the spring biased members at selected locations between the first and second reverse bends and function, upon the biased members seating within a selected aperture of a vehicle frame, to abut against an adjoining edge of the frame defining the aperture and to assist in preventing unseating and withdrawal of the clip and associated molding.

5 Claims, 2 Drawing Sheets

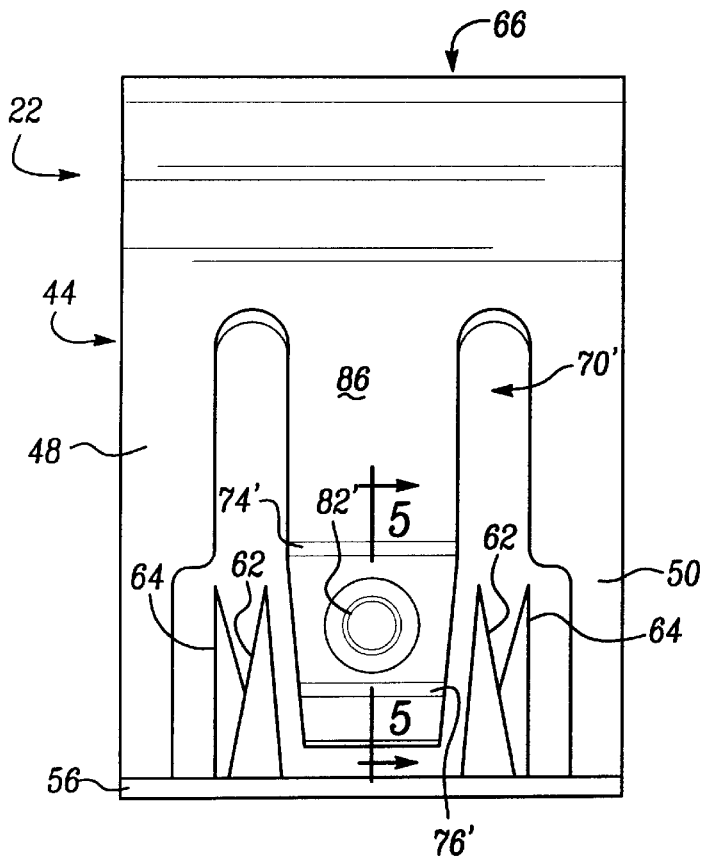
Fig-4
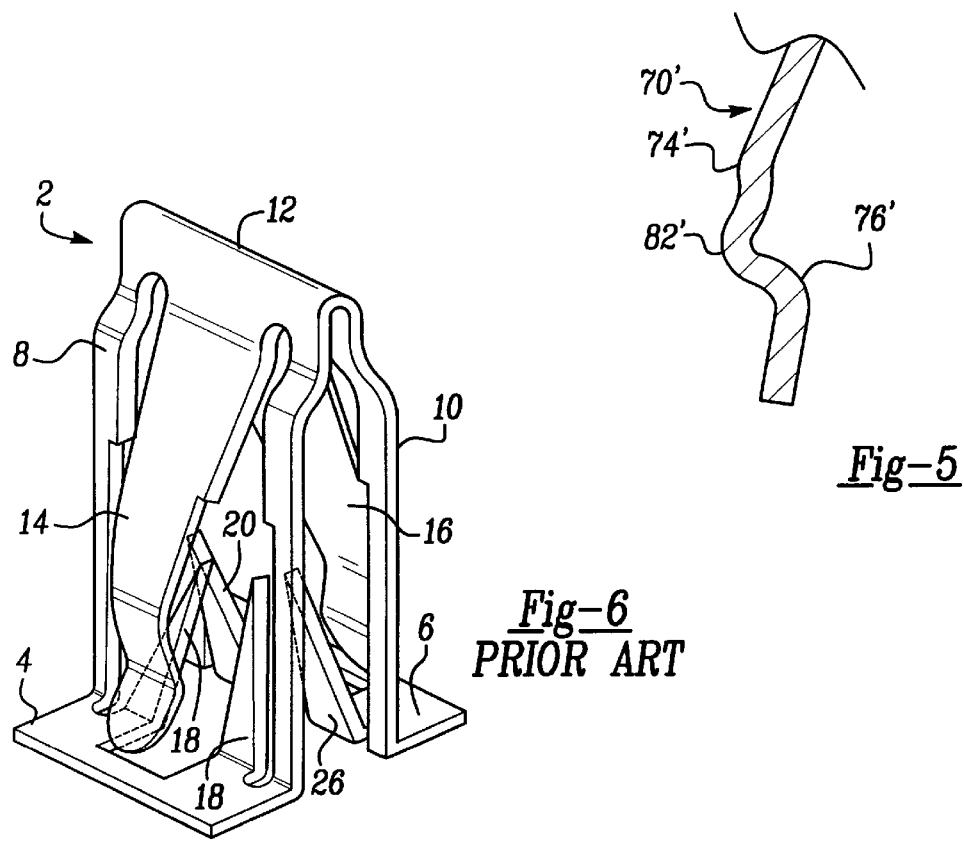
Fig-5
Fig-6
PRIOR ART

EDIAS CLIP FOR SECURING AN INTERIOR MOLDING TO A VEHICLE FRAME

BACKGROUND OF THE INVENTION

1. Field of the Invention

The present invention relates generally to clip designs for use in securing interior and exterior vehicle moldings, and particularly plasticized moldings, to a vehicle frame.

2. Description of the Prior Art

Clip assemblies are well known in the art for retaining plasticized molding, trim and impact strips to a vehicle frame. As the moldings and trim are typically constructed of very different polymerized or synthetic materials as compared to the steel vehicle frame, it is important that an effective retaining means be employed as adhesives and the like are typically ineffective for holding to the trim and moldings to the frame.

Referring to FIG. 6, an example of a prior art fastener clip is illustrated at 2 and includes a body with flattened base plates 4 and 6, upwardly extending sides 8 and 10 and a curved and interconnecting top edge 12. The upwardly extending sides 8 and 10 each are machined and fabricated so that a center is open and first and second spring biased members, 14 and 16 respectively, extend in generally downwardly and multiple reverse bended or undulated fashion from the top edge 12 to the vicinity of the base plates 4 and 6. Additional pairs of tangs 18 and 20 extend in upwardly and generally inwardly fashion from inner opposing surfaces of the base plates 4 and 6 and terminate in pointed ends.

The purpose of the pairs of tangs is to fixedly secure the fastener clip in upwardly extending fashion to a projecting ridge formed along a reverse side of such items as plastic moldings and trim pieces. The spring biased members serve to initially inwardly deflect upon insertion of the clip through an aperture in the vehicle frame and subsequently outwardly deflect to hold the clip and attached trim piece in place.

While effective to a limited degree in securing a trim piece to a vehicle frame, the configuration of the prior art clip of FIG. 6 suffers from the shortcoming of tending to jiggle or rock within both its mount to the polymerized trim piece and the metal frame, as well as being able to only exert a limited degree of holding force, typically 20 lbs per square inch. Accordingly, it is commonplace for the clip and trim piece to become disengaged from its securing position to the vehicle frame.

Additional examples of molding clips are shown in such prior art references as U.S. Pat. No. 4,630,338, issued to Osterland et al., No. 4,103,400, issued to Munse, No. 5,263,233, issued to Kim et al., and No. 5,367,751, issued to DeWitt. In each case, the reference illustrated includes a pair of first and second spring-biased members which are reverse bent for biasingly engaging a trim piece or molding to a typically metallic frame. A further unique example of a fastener clip assembly is illustrated in U.S. Pat. No. 5,722,124, issued to Wisniewski, and which shows four interlocking and upwardly extending interengaging members for securing an interior vehicle panel to a metal bracket.

SUMMARY OF THE PRESENT INVENTION

The present invention is an EDIAS clip for securing a vehicle molding trim piece, strip or component to a vehicle frame in a more secure and withdrawal resistant fashion than it provided by the prior art. Specifically, the clip includes a body with a first upwardly extending side and a second upwardly extending side. First and second flattened base plates extend in substantially perpendicularly and outward fashion from lower edges of the first and second extending sides and the sides are further interconnected by a substantially "U" shaped curved top portion.

The base plates are spaced apart to define therebetween a central and vertical extending opening in the body for receiving a thin and elongate projection from a selected reverse face surface of the molding to be attached. First and second pairs of tangs extend inwardly and upwardly from inward facing surfaces of the base plates and serve to grip opposite sides of the molding projection to secure the clip thereto.

First and second elongate and spring biased members extend in generally downwardly and first and second reverse bended fashion from opposing edges of the "U" shaped interconnecting top portion. The spring biased members further include bulbous portions projecting from locations along the biasing members and between the first and second reverse bends such that, upon biasing engagement of the spring members between adjoining surfaces of a frame aperture, the projecting bulbous portions abut against a selected spaced and inner edge of the frame aperture to resist in unseating and withdrawal of the clip.

BRIEF DESCRIPTION OF THE DRAWINGS

Reference will now be made to the attached drawings, when read in combination with the following specification, wherein like reference numerals refer to like parts throughout the several views, and in which:

FIG. 4 is a front view of the clip according to a slightly modified variant of the present invention and again illustrating the offset nature of the first and second pairs of tangs for gripping the molding;

FIG. 5 is a cutaway view taken along line 5—5 of FIG. 4 and showing a side configuration of the bulbous projecting portion of a selected spring biased member; and FIG. 6 is a perspective view of a clip according to the prior art which is illustrated for sake of comparison.

DETAILED DESCRIPTION OF THE PREFERRED EMBODIMENT

Figure 1:
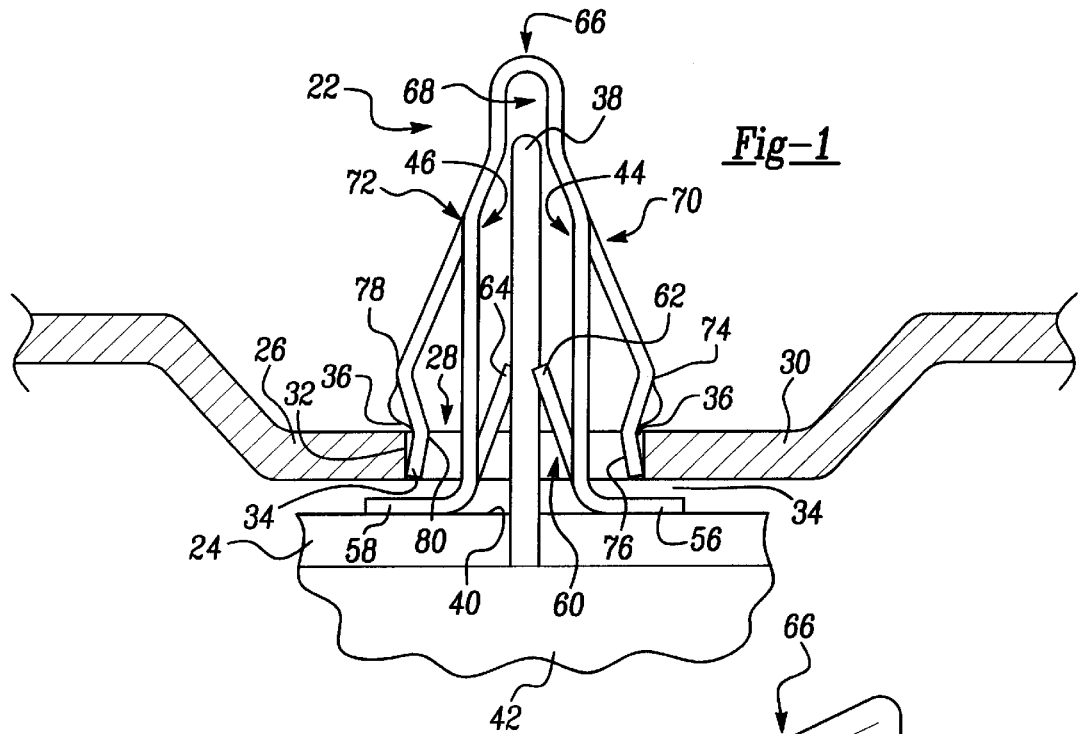
FIG. 1 is a cutaway view in side section and illustrating the clip according to the present invention for securing a trim piece to an vehicle frame.

Referring now to FIGS. 1–4, and particularly to FIG. 1, a clip is illustrated at 22 for securing an interior molding 24 to a portion of a vehicle frame 26 and particularly to a specified aperture 28 of the frame 26 which is further defined by adjoining side surfaces 30 and 32 as well as outer edge surfaces 34 and inner edge surfaces 36. As will also be further explained subsequently, the molding 24 further includes a substantially thin and elongate projection 38 extending along a reverse face 40 of an exterior face 42 of the molding and which is gripped by the clip 22.

Figure 2:
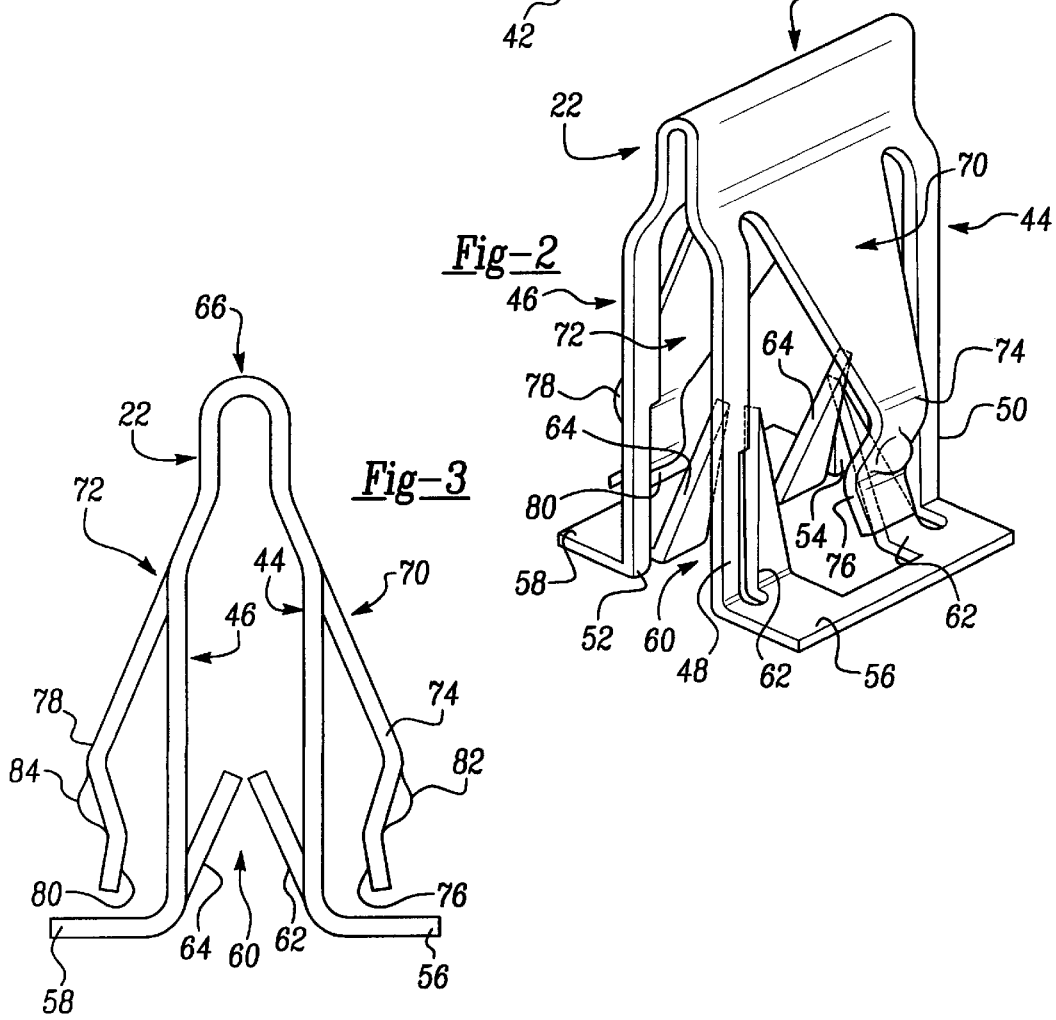
FIG. 2 is a perspective view of the clip according to the present invention.

The clip includes a body with a first upwardly extending side 44 and a second spaced apart and upwardly extending side 46. The first and second sides 44 and 46 are each further defined by first and second downwardly extending pillars (see 48 and 50 for first side 44 and 52 and 54 for second side 46 as best shown in FIG. 2). First and second base plates 56 and 58 extend perpendicularly from lower edges of the first and second extending sides 44 and 46, respectively. The first and second base plates 56 and 58 are spaced apart to define therebetween a central and vertical extending opening (see at 60) in the body of the clip for receiving in inserting fashion the elongate extending projection 38 of the molding 24.

The body further includes first 62 and second 64 pairs of spaced apart and upwardly and inwardly angled tangs which terminate in pointed ends. As further best shown in the frontal view of FIG. 4, the first pair of tangs 62 is laterally offset a degree from the second pair 64 of tangs. The purpose of the pairs of tangs 62 and 64 is to grip therebetween the projecting edge of the thin elongate portion 38 extending from the molding reverse face and to prevent withdrawal of the portion 38 from within the central and vertical extending opening 60 of the clip.

The first and second upwardly extending sides 44 and 46 of the clip 22 are further interconnected along corresponding upper edges by a substantially "U" shaped curved and interconnecting top portion 66. The "U" shaped interconnecting top portion 66 further defines in cross section a narrower channel 68 with respect to the central and vertical extending opening 60 defined between the first and second sides 44 and 46.

First and second elongate and spring biased members 70 and 72 extend in generally downwardly and first and second reverse bended fashion from opposing edges of the substantially "U" shaped interconnecting top portion 66 and along open central portions of the first and second extending sides 44 and 46. The open central portions of the sides 44 and 46 again are defined by the pairs of outer pillars 48 and 50 and 52 and 54 which define the outer ends of the sides 44 and 46.

The first reverse bend of spring biased member 70 is illustrated at 74 and the second reverse bend at 76. Likewise, the first reverse bend of spring biased member 72 is illustrated at 78 and the second reverse bend at 80. A first bulbous and outwardly projecting portion 82 extends from the first spring biased member 70 at a selected location between the first reverse bend 74 and the second reverse bend 76. Likewise, the second bulbous and outwardly projecting portion 84 extends from the second spring biased member 72 at a similar selected location between the first reverse bend 78 and the second reverse bend 80.

As best illustrated in FIG. 1, upon the first and second spring biased members 70 and 72 (typically constructed along with the rest of the clip from a biasing and resistant stainless steel construction) being snappingly engaged through a selected and configured aperture of the vehicle frame (see aperture 28 of frame 26) the spring members bias in opposite and outward directions to seat against the adjoining surfaces 30 and 32 of the vehicle frame aperture. The biasing members 70 and 72 (as again best shown in FIG. 1) seat against the adjoining surfaces of the aperture so that the terminating portions of the spring members which extend from the second reverse bends (76 and 80) abut against the outer edges 34 of the aperture and further so that the bulbous projecting portions 82 and 84 abut against the space and inner corresponding edges 36 of the frame to resist unseating and withdrawal of the clip 22.

Figure 3:
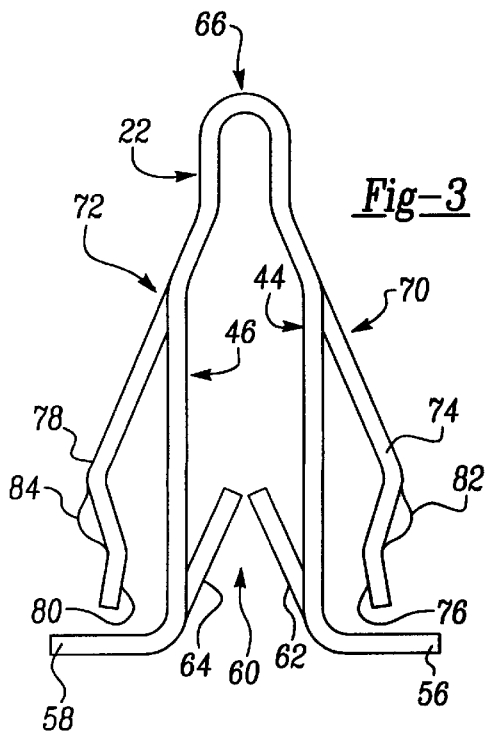
FIG. 3 is a side view similar to FIG. 1 and illustrating the clip according to the present invention.

As is best shown in the preferred embodiment 22 of the FIGS. 1–3, the first and second elongate and spring biased members 70 and 72 each define a generally elongate and planar shape which continually narrows in width from the interconnecting "U" shaped top portion to the terminating lower edges. Referring further to FIG. 4, a slight variation of the spring biased members (see first member 70') is illustrated in which a first planar portion 86 is consistent in width along its length leading to the first reverse bend 74' and then narrows along its terminating width to the bottom edge. As is also shown in the cutaway of FIG. 5, the spring biased member shown at 70' likewise includes the bulbous projecting portion 82' for facilitating in providing enhanced gripping against the metal frame adjoining the insertion aperture.

As a result of the clip design according to the present invention, the typical withdrawal force necessary for disengaging the clip from the vehicle frame aperture is typically 40 pounds per square inch or more, as opposed to the approximately 20 pounds per square inch of resistive force offered by the clip design of FIG. 6 and according to the prior art. The clip design according to the present invention also overcomes the prior art problem of rocking of the clip within the molding piece mount and when installed onto the vehicle frame.

The present invention therefore teaches a spring clip which is a novel improvement over the prior art in that it provides for enhanced gripping of the metal frame upon insertion into the specified aperture and due to the placement and configuration of the bulbous projecting portions extending from between the first and second reverse bends of the first and second spring biased members. Having described my invention, additional preferred embodiments will become apparent to those skilled in the art to which it pertains without deviating from the scope of the appended claims.

I claim:

1. A clip for securing an interior molding to a vehicle frame, the interior molding including an exterior decorative face and at least one substantially thin and elongate projection extending along a reverse face for being gripped by said clip, the vehicle frame further including an appropriately configured aperture for being biasingly engaged by said clip, said clip further comprising:

a body including a first upwardly extending side, a second upwardly extending side, a first flattened base plate extending substantially perpendicularly from a lower edge of said first extending side and a second flattened base plate extending substantially perpendicularly from a lower edge of said second extending side, said body further including a substantially "U" shaped curved and interconnecting top portion;

said first and second base plates being spaced apart to define therebetween a central and vertical extending opening in said body for receiving in inserting fashion the thin and elongate projection along the reverse face of the molding, said body further including first and second pairs of spaced apart and upwardly and inwardly angled tangs extending from inwardly facing surfaces of said base plates, said tangs gripping opposite sides of the molding elongate projection to secure said clip thereto; and first and second elongate and spring biased members extending in generally downwardly and first and second reverse bended fashion from opposing edges of said substantially "U" shaped interconnecting top portion and along open central portions of said first and second extending sides, first and second bulbous and outwardly projecting portions extending from said spring biased members at selected locations between said first and second reverse bends;

wherein, upon said first and second spring biased members being snappingly engaged through a selected configured aperture of the vehicle frame, said spring members biasing in opposite and outward directions to seat against the adjoining surfaces of the vehicle frame defined by the aperture, said biased members upon seating each extending at locations extending from between said second reverse bend to a terminating lower edge which abuts against an outer edge of the frame aperture, said bulbous and outwardly projecting portions abutting against a spaced and inner edge of the frame aperture to resist unseating and withdrawal of said clip and to prevent rocking movement of said clip within the interior molding and when installed onto the vehicle frame.

2. The clip according to claim 1, said first pair of spaced apart and upwardly and inwardly angled tangs extending in an offset fashion from said second pair of spaced apart and upwardly and inwardly angled tangs.

3. The clip according to claim 1, said substantially "U" shaped curved and interconnecting top portion defining in cross section a narrower channel width with respect to said central and vertical extending opening defined between said first and second sides.

4. The clip according to claim 1, said first and second elongate and spring biased members each defining a generally elongate and planar shape which continually narrows in width from said interconnecting "U" shaped top portion, along said first and second reverse bends, and to said terminating lower edge.

5. The clip according to claim 1, said central and vertical extending openings of each of said first and second sides of said body further being defined by first and second pillars extending from said "U" shaped top portion to said associated base plate.

* * * * *